US008531051B2

(12) United States Patent
Suzuki

(10) Patent No.: US 8,531,051 B2
(45) Date of Patent: Sep. 10, 2013

(54) ENGINE START CONTROL SYSTEM FOR HYBRID ELECTRIC VEHICLE

(75) Inventor: Hiroyuki Suzuki, Sagamihara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 86 days.

(21) Appl. No.: 13/409,658

(22) Filed: Mar. 1, 2012

(65) Prior Publication Data
US 2012/0292919 A1 Nov. 22, 2012

(30) Foreign Application Priority Data

May 19, 2011 (JP) ................................. 2011-112159

(51) Int. Cl.
*H02P 9/04* (2006.01)

(52) U.S. Cl.
USPC ....................................... 290/40 C; 123/179.3

(58) Field of Classification Search
USPC ....................................... 290/40 C; 123/179.3
See application file for complete search history.

(56) References Cited

U.S. PATENT DOCUMENTS

| 3,888,325 | A  | * | 6/1975  | Reinbeck         | 180/65.25  |
|-----------|----|---|---------|------------------|------------|
| 6,722,332 | B2 | * | 4/2004  | Kojima           | 123/179.3  |
| 6,742,487 | B2 | * | 6/2004  | Yamaguchi et al. | 123/179.3  |
| 2001/0022166 | A1 | * | 9/2001  | Yamaguchi et al. | 123/179.3  |
| 2006/0028024 | A1 | * | 2/2006  | Franke           | 290/40 C   |
| 2008/0006457 | A1 | * | 1/2008  | Fujimoto et al.  | 180/65.1   |
| 2008/0245332 | A1 | * | 10/2008 | Rimaux et al.    | 123/179.24 |
| 2010/0116235 | A1 | * | 5/2010  | Imamura et al.   | 123/179.3  |

FOREIGN PATENT DOCUMENTS

JP    01095944 A  *  4/1989

* cited by examiner

*Primary Examiner* — Joseph Waks
(74) *Attorney, Agent, or Firm* — Young Basile

(57) ABSTRACT

By avoiding an excessive cranking torque when starting the engine by a motor/generator and expanding a motor running region, fuel economy is improved. For a large required acceleration, cranking torque Tcr is maintained to hold an initial value, while, when the required acceleration is small, cranking torque Tcr will be adjusted to decrease. The time between an engine start command and the instant at which engine rotation speed Ne reaches a predetermined rotation speed Ne is measured as an engine start time TMst. When the TMst is below a limit value TMst_Lim that is capable of starting the engine and acceptable, as shown at instants t2 and t4, Tcr will be adjusted to decrease by a decrease amount, $\Delta Tcr\_dec$ and updated, while the expression $Mst \geq TMst\_Lim$ is met, then Tcr will be adjusted by an increase amount $\Delta Tcr\_inc$ at instant t6 and updated.

16 Claims, 10 Drawing Sheets

ENGINE START CONTROL SYSTEM FOR HYBRID ELECTRIC VEHICLE

CROSS-REFERENCE TO RELATED APPLICATION

This application claims priority from Japanese patent application serial no. JP2011-112159, filed May 19, 2011, which is incorporated herein in its entirety by reference.

TECHNICAL FIELD

Disclosed herein are embodiments of an engine start control system, including but not limited to a cranking torque control technique at an engine start for a hybrid electric vehicle (HEV). The HEV has a power train comprised of an engine, a first clutch, motor/generator, a second clutch and driving wheels as the torque transmission path arranged in these order and has two driving modes by selectively controlling an engagement or release of the first and second clutches so that the vehicle may be either electrically driven by the motor/generator only, or may be driven by both the engine and the motor/generator under a hybrid mode.

BACKGROUND

In the above described HEV, such as disclosed in Japanese Patent Application Unexamined Publication No. 2010-179865, a so-called one-motor, two-clutch, parallel hybrid vehicle is known in which a motor/generator is interposed between the engine and driving wheels, and the power transmission path between the engine and motor/generator may be selectively established by a first clutch, while the power transmission path between the motor/generator and the driving wheels may be selectively releasable by the second clutch.

HEV may select an EV mode by releasing the first clutch with the second clutch engaged so that the vehicle is driven by the motor/generator only. The HEV may alternatively select a HEV mode by engaging both the first and second clutches so that the vehicle runs under a collaboration of the engine and motor/generator.

In this one-motor, two-clutch, parallel hybrid vehicle, during an operation of EV mode selected at low load, low rotation engine speed condition, in response to an increase in required driving force (required acceleration) such as upon an accelerator pedal depression operation by the driver, for example, when it is determined that the motor/generator would not suffice to provide the required driving force (or required vehicle acceleration), a change or switch over to an HEV mode will be initiated for a coordinated control by both the engine and motor/generator When staring the engine at this switching of the control mode from EV mode to HEV mode, the first clutch, which has been released during EV mode, is now engaged, and motor torque from the motor/generator will start the engine.

BRIEF SUMMARY

However, to ensure the engine start disclosed in the above patent application, the rated torque of motor/generator has a sufficient amount that can meet a sum of EV running torque and a cranking torque required for engine starting. The EV running torque is comprised of the driving torque indicating a torque corresponding to the running resistance of the vehicle (i.e., air resistance, rolling resistance, etc.) plus an acceleration torque margin that is defined to correspond to a prescribed vehicle acceleration.

Incidentally, it is generally desirable to keep the rated torque small, and thus the motor/generator as compact as possible in terms of installation space and cost point of view so that the amount of rated torque may be restricted. On the other hand, however, even if the rated torque be restricted, there is a limit in down-sizing since the required acceleration margin and cranking torque portion are generally predetermined at certain range and difficult to be excessively reduced.

It is a common practice to set the cranking torque portion relatively larger than necessary based on the maximum acceleration performance so that engine will be started even in situations that require the greatest acceleration in response to a maximum acceleration request, and the driving force or torque of the vehicle will be increased without delay and in accordance to the request. Therefore, in the situations where the required acceleration of the vehicle is small, the cranking torque portion may be excessive as compared to the required acceleration. Consequently, when the required acceleration is small, the above driving torque portion which may be obtained by deducting the acceleration torque margin and cranking torque portion from the rated torque becomes small.

When the driving torque portion is reduced this way, because of a lack of torque, the situation might occur earlier, i.e., even at a low vehicle speed, in which a vehicle running under EV mode is not feasible and thus the mode has to be changed to HEV mode earlier, i.e., from a low vehicle speed, in which the vehicle will be driven through cooperation with the engine and motor/generator. This entails a narrow region of EV mode intended for improved fuel consumption effect and resulting in a problem of worsening the vehicle fuel efficiency.

The present invention was made based in part on the recognition that the above problem is attributable to the fact that the cranking torque portion which has been set larger in view of the required maximum acceleration and is applied or used as such even to the situation in which only a smaller degree of acceleration is required. Therefore, according to the present invention, the object resides in providing an engine start control system in which the cranking torque portion s adjusted and applied depending on the magnitude of the required acceleration such that an excessive cranking torque portion is avoided to be given when a required acceleration is small such that the above problem of a bad vehicle fuel efficiency due to a small region of EV mode operation may not be encountered.

To meet this objective, the engine start control system according to an embodiment is outlined below.

Initially, a general configuration of hybrid electric vehicles (HEV) is explained. The HEV includes along the torque path/driveline from upstream side, an engine, a first clutch, a motor/generator, a second clutch, and driving wheels in these order. By selectively connecting/disconnecting the first and second clutches, operation modes are selectable, and the vehicle may be driven electrically by the motor/generator only, or instead, driven under a hybrid mode by both the engine and motor/generator.

Further, the engine start control system to be used in the HEV is generally configured to start the engine by connecting the above first clutch for supplying a cranking torque portion from the motor/generator.

More specifically, the engine start control system according to the present invention may be characterized by a cranking torque portion changes or adjustment means to reduce cranking torque portion at a low vehicle acceleration demand or requirement.

According to the engine start control system of the present invention, since the cranking torque portion is adjusted to be small when the required acceleration of the vehicle is small, no excessive cranking torque portion is applied when the required acceleration is small.

Accordingly, when the required acceleration is small, the driving torque which is determined by deducing the cranking torque portion from the rated torque of motor/generator will not be small, so that the occurrence of such a situation may be put off in which the electrical running by the motor/generator only will not be possible (and thus compelled to switch to a hybrid running mode) with the result that the electric driving region to be intended for better fuel consumption may be expanded to more high-vehicle speed region and the worsening of the aforementioned problems of deterioration of fuel efficiency may be resolved.

BRIEF DESCRIPTION OF THE DRAWINGS

The description herein makes reference to the accompanying drawings wherein like reference numerals refer to like parts throughout the several views, and wherein.

DETAILED DESCRIPTION

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
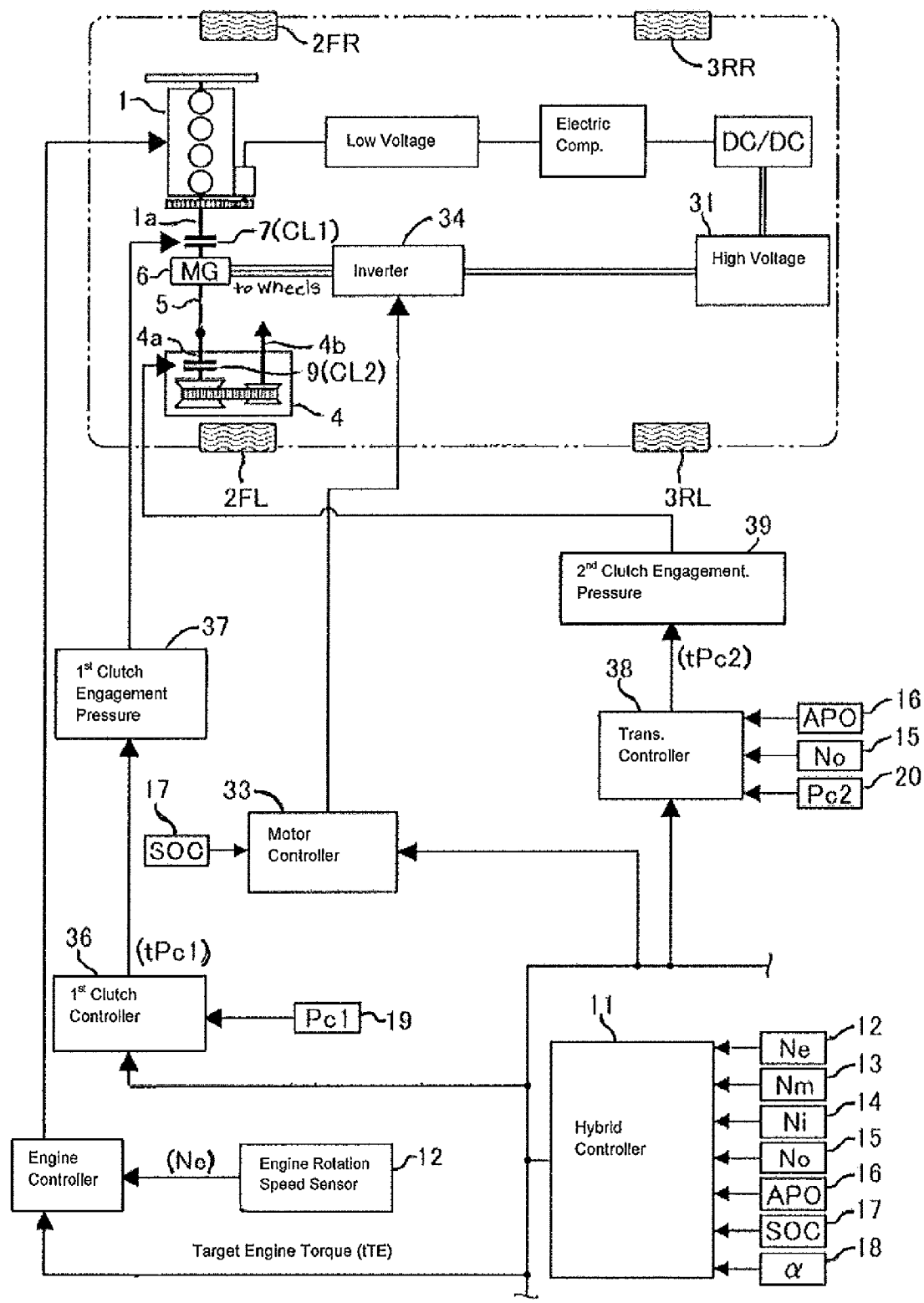
FIG. 1 is a schematic system diagram illustrating a hybrid electric vehicle power train with the present engine control system shown in conjunction with its control system according to one embodiment of the present invention.

Referring initially to FIG. 1, a powertrain for a hybrid vehicle with an engine start control system according to one embodiment of the present invention is schematically shown. This HEV is obtained by doing alterations on a conventional front engine, front wheel drive vehicle (Front wheel drive vehicle) as a base platform. In FIG. 1, reference 1 denotes an engine as power source, 2FL and 2FR denote left front wheel and right front wheel, respectively, i.e., left and right driving wheels, 3RL, 3RR denotes a left rear wheel and right rear wheel (left right driven wheels)

In the power train of the hybrid vehicle shown in FIG. 1, as in the conventional front wheel drive vehicles, a V-belt continuous variable transmission (CVT) 4 is positioned in a transverse direction of the vehicle on a side of the transverse engine 1 to convey a rotation of the engine (i.e., crank shaft 1a thereof) to an axis 5 for transfer to an input shaft 4a of CVT 4 via motor/generator (M/G) 6 by operating (M/G) 6 as a power source.

Motor/generator 6 has an annular stator 6a mounted within a housing and a rotor 6b coaxially disposed within stator 6a mounted within a housing and a rotor 6b coaxially disposed within stator 6a with a preset amount of gap, and responsive to the driving condition associated command, motor/generator 6 is intended to function either as an electric motor (electric motive) or as a generator. Motor/generator 6 is placed between the engine 1 and CVT 4. Motor/generator 6 has the above mentioned axis connected to and through the center of the rotor 6b and uses this axis 5 as a motor/generator axis.

Between motor/generator 6 and engine 1, more specifically, between motor/generator axis 5 and engine crankshaft 1a is interposed a first clutch 7 (CL1) such that a connection between engine 1 and motor/generator 6 may be selectively releasable.

It should be noted that first clutch 7 is configure to continuously vary the transmission torque capacity (clutch engagement capacity) and, for example, may be composed, for example, by a wet type multi-plate clutch whose transfer torque capacity (clutch capacity) may be changed by continuously controlling a clutch operating oil flow rate and clutch operative pressure by a linear solenoid valve.

Between motor/generator 6 and V belt continuously variable transmission is connected or engaged to each other by a direct connection of motor/generator shaft 5 to transmission input shaft 4a, and a second clutch 9 (12) is interposed within the transmission input shaft 4a.

V-belt CVT 4 may be of the conventional type in which a torque converter is removed and motor/generator 6 is directly connected to transmission input shaft 4a instead. When the transmission input shaft 4a is in an engaged state, rotation speed of input shaft 4a is changed depending on the reduction ratio corresponding a pulley ratio of the V-belt CVT to output to output shaft 1b.

The rotation of output shaft 4b of V-belt CVT is transmitted to and distributed via differential gear unit (not shown) to left and right front wheels 2FL, 2FR for propulsion of the vehicle.

It should be noted that the V-belt CVT may be replaced by a step automatic transmission.

It should be noted that second clutch 9 (CL2) that is indispensable to a hybrid vehicle for selectively engaging motor/generator 6 with driving wheels 2FL, 2FR may be disposed in a downstream side of the V-belt CVT 4, instead of being interposed in the transmission input shaft 4a, as shown in FIG. 1. However, second clutch 9 may change a transmission torque capacity (clutch engagement capacity) continuously as in the case of first clutch 7.

In the following, description of the running mode of the above-mentioned power train is made with reference to FIG.

1. In the following, description of the mode selection function of the above-mentioned power train is made with reference to FIG. 1.

In the powertrain shown in FIG. 1, when an electrically driven mode (EV mode) is required in a low-load, low vehicle speed condition including a vehicle start from a vehicle stop state, first clutch 7 is released and second clutch 9 is engaged.

Driving the motor/generator 6 in this state, only output rotation from the motor/generator 6 is directed to input shaft 4a of transmission 4, which in turn converts the rotation thereto responsive to a pulley ratio under selection and outputs from the transmission output shaft 4b.

Rotation from the transmission output shaft 4b will then be transmitted, through a differential gear device (not shown), finally to front wheels 2FL, 2FR. The vehicle can thus travel only by the electric motor/generator 6 (under EV mode).

When a hybrid running operation (HEV mode) is required such as at high speed driving or under a heavy load condition, the first clutch 7 is engaged and the second clutch 9 is engaged.

In this state, both the output rotation from the engine 1 and output speed from motor/generator 6 will be reached to transmission input shaft 4a in a collaborative or coordinated way, and V-belt CVT 4 changes the rotation speed of the input shaft 4a to output an appropriate speed from the output shaft 4b, depending on the pulley ration under selection. Rotation from the transmission output shaft 4b will then reach the front wheels, 2FL, 2FR through differential gear unit (not shown) to allow to operate the vehicle by both the engine 1 and motor/generator 6 in a hybrid running operation (HEV running mode).

While driving in the HEV running mode, when a surplus energy is produced by operating the engine 1 at an optimum fuel consumption, motor/generator 6 will be allowed to operate as a generator for the excess energy to be converted into electricity energy such that the electricity power generated will stored in a battery for future use of the motor/generator 6 for a motor operation to thereby improve fuel efficiency of the engine 1.

The selection of the above described EV mode and HEV mode may be conducted as follows. When vehicle speed is below a predetermined value (e.g., below 30 km/h), and accelerator opening is less than a predetermined openness (e.g., below ⅛) or change rate of accelerator opening is less than a predetermined acceleration command (e.g., 0.05 G), motor/generator speed is less than a predetermined motor speed (e.g., 1000 rpm or less), engine cooling water temperature is more than a predetermined value (e.g., 40° C. or more) and finally battery storage condition, SOC (state of charge) exceeds a preset storage condition (e.g., 60% or more), then an EV mode is commanded and the vehicle is driven solely electrically, i.e., by motor/generator 6 only.

However, if one of the above conditions necessary for EV mode selection should fail, for example, accelerator opening exceeds the predetermined opening (⅛) during an EV driving state in response to depressing on accelerator pedal, or the change rate in accelerator pedal exceeds the predetermined acceleration command (0.05 G) or the battery storage condition SOC falls below the predetermined stored condition (60%), an HEV mode will be commanded for a hybrid (HEV) driving under coordinated operations of engine 1 with Motor/generator 6.

Hereinafter, a control system is described for hybrid vehicle powertrain above described and comprised by engine 1, the motor/generator 6, first clutch 7 (CL1), and second clutch 9 (CL2) with reference to FIG. 1. The control system comprises a controller 11 for controlling a hybrid powertrain operating point in a collaborative or coordinated way. Specifically, the operating point of the powertrain may be defined by a target engine torque tTe, a target motor/generator torque tTm, a target engaging capacity of first clutch 7, tTc1 (first clutch engaging pressure command value tPc1), and a target engaging capacity of second clutch 9, tTc2 (second clutch engaging pressure command value tPc2).

In order to determine an operating point of the above powertrain, the hybrid controller 11 is supplied with a plurality of signals including a signal from engine rotation speed sensor 12 that detects an engine rotation speed Ne, a signal from motor/generator rotation speed sensor 13 that detects a rotation speed of motor/generator Nm, a signal from input rotation speed sensor 14 that detects a rotation speed of the transmission input Ni, a signal of output rotation speed sensor 15 that detects a transmission output rotation speed No (vehicle speed VSP), a signal of accelerator pedal openness sensor 16 that detects an accelerator pedal stroke (accelerator opening APO), a signal from storage condition sensor 17 that detects a storage condition or state of charge (SOC) of battery 31 for storing electricity power for motor/generator 6, and finally a signal from an engine stop position sensor 18 that detect a crank angle a at which engine 1 has stopped.

Hybrid controller 11 selects an operation mode (EV mode or HEV mode) that can achieve the driving power the driver desires based on the accelerator opening degree APO, battery storage condition SOC, and transmission output rotation speed No (i.e., vehicle speed, VSP) among the above referenced information. In addition, the hybrid controller 11 calculates a target engine torque tTe, target motor/generator torque tTm, target first clutch engaging capacity tTc1, and target second clutch engaging capacity tTc2, respectively.

The target engine torque, tTe is supplied to the engine controller 32. The controller 32 in turn controls engine 1 to attain the target engine torque tTe by employing controls such as a throttle opening control and fuel injection quantity control under a prevailing engine speed Ne based on the engine rotation speed Ne detected by sensor 12 and the target engine torque tTe supplied.

The target motor/generator torque tTm is supplied to the motor controller 33. The motor controller 33 in turn operates to convert a direct current from the battery 31 to alternate current by inverter 34, or supplies the inverted current to a stator 6a of motor/generator 6 under the control of inverter 34 to control motor/generator so that the motor/generator torque matches target motor/generator torque tTm.

When the target motor/generator torque target tTm is determined such as to require a regenerative braking effect on the motor/generator 6, the motor controller 33 will apply an appropriate amount of load for electricity generation on motor/generator 6 so as not to overcharge in view of the battery charge condition SOC detected by sensor 17 so that electricity generated by motor/generator 6 by the regenerative braking will be converted through an inverter 34 from AC to DC for storage in the high voltage battery 31.

The target first clutch engagement capacity tTc1 is supplied to the first clutch controller 36. The first clutch controller 36 in turn compares a first clutch engagement pressure command value tPc1 corresponding to the target first clutch engagement capacity tTc1 with an engagement pressure Pc1 of the first clutch 7 detected by sensor 19, and performs an engagement capacity control on first clutch 7 by controlling the engagement pressure of first clutch 7 via a first clutch engagement pressure control unit 37 so that the first clutch engagement pressure Pc1 equals to the first clutch engagement pressure command value tPc 1.

The target second clutch engagement capacity tTc2 is supplied to the transmission controller 38. The transmission controller 38 in turn compares a second clutch engagement pressure command value tPc2 corresponding to the target second clutch engagement capacity tTc2 with an engagement pressure Pc2 of the second clutch 9 detected by sensor 20, and performs an engagement capacity control on second clutch 9 by controlling the engagement pressure of second clutch 9 via a second clutch engagement pressure control unit 39 so that the second clutch engagement pressure Pc2 equals to the second clutch engagement pressure command value tPc2.

Note that the transmission controller 38 seeks the preferred gear ratio from the current gear ratio based on a map prepared using the transmission output rotation speed No detected by the sensor 15 (vehicle speed, VSP) and the accelerator opening APO detected by sensor 16 and causes a speed change from a current pulley ratio to the preferred pulley ratio.

Figure 2:
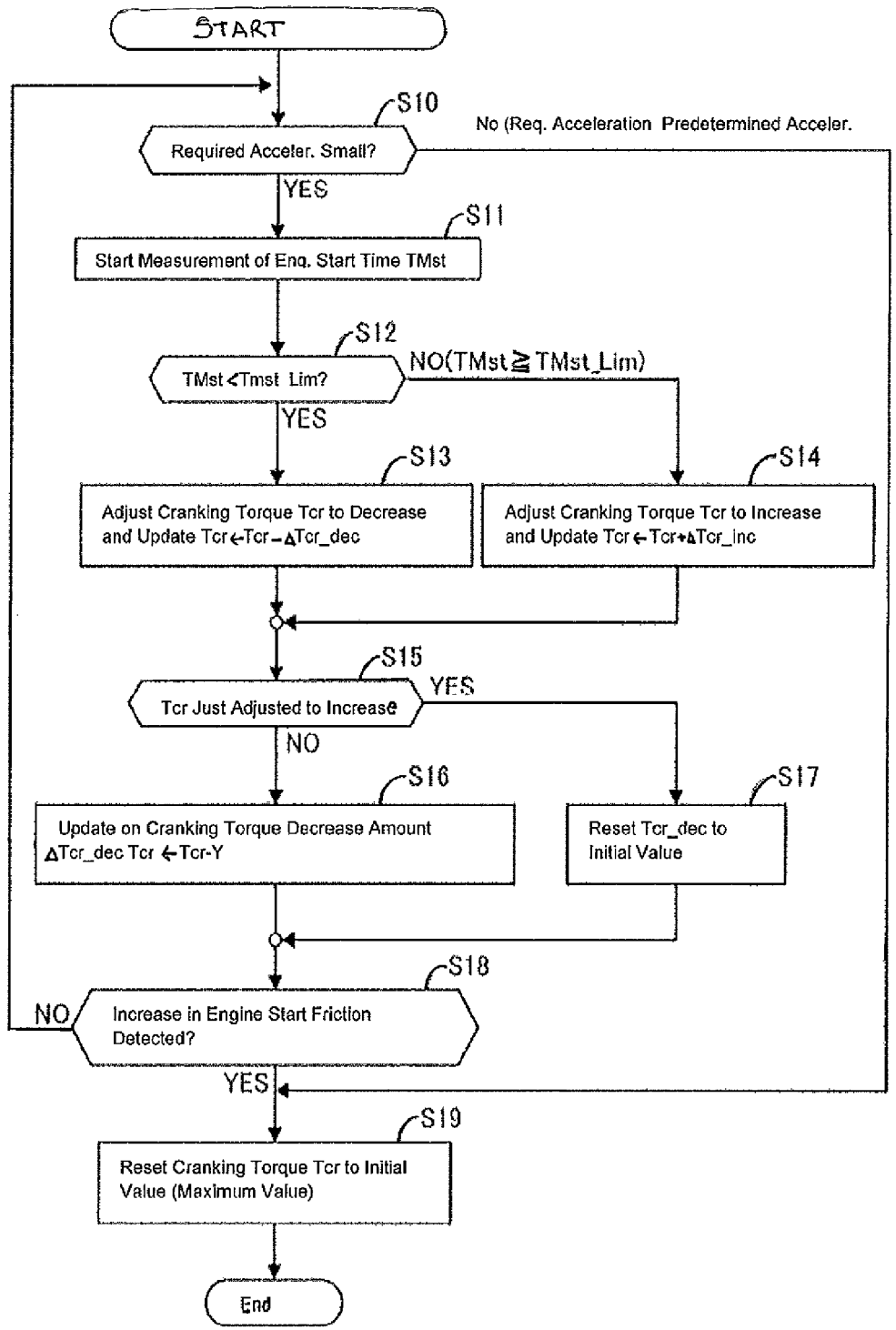
FIG. 2 is a flowchart for explaining the cranking torque control program executed by a hybrid controller of the power train control system illustrated in FIG. 1.

Although the above description is an outline of a normal control performed by the control system in FIG. 1, in this embodiment, however, a hybrid controller 11 in FIG. 1 is employed to perform a learning control program in FIG. 2 and adjust a cranking torque Tcr for an engine start control (cranking torque control) according to the present invention.

Note that starting the engine is performed by having clutch 7 (CL1) connected and cranking the engine 1 by cranking torque Tcr from the motor/generator 6. During this engine starting period, the cranking torque control in FIG. 2 will be performed.

Initially, in step S10, a determination is made as to whether the vehicle accelerator command reflected in an accelerator pedal manipulation by a drive is small or not based on accelerator opening APO and its change rate over time. When the required acceleration is not less than a predetermined acceleration, cranking torque Tcr is reset to an initial value in step S19.

The initial value of the cranking torque Tcr, should be defined with a maximum required acceleration in mind and set for a such magnitude of cranking torque which enables an increase in engine speed from zero rpm to 1000 rpm within 0.3 seconds so that, even in situations that require the greatest acceleration, engine start is performed in response to the maximum required acceleration so as to increase the driving force of the vehicle without delay of acceleration command. Thus, when a determination is made whether the required acceleration is small in step S10, the decision shall be made depending on whether the required acceleration is less than the predetermined acceleration that is set in the vicinity of the above maximum required acceleration.

If the required acceleration is determined to be larger than the predetermined acceleration in step S10, in step S19 as described above, the cranking torque Tcr shall be set to the initial value (maximum). By starting the engine in a responsiveness that corresponds to the great required acceleration near maximum, vehicle driving force will be increased without delay in response to command.

However, if the required acceleration is determined to be small and less than the above referenced predetermined acceleration, as described below, cranking torque Tcr will be adjusted to take a smaller value than the above initial value (maximum value) in steps S11 to S18. In step S11, the measurement of engine start time tMs1 required for start of engine is started. Therefore, step S11 corresponds to an engine start time measurement means according to the present invention.

Figure 3:
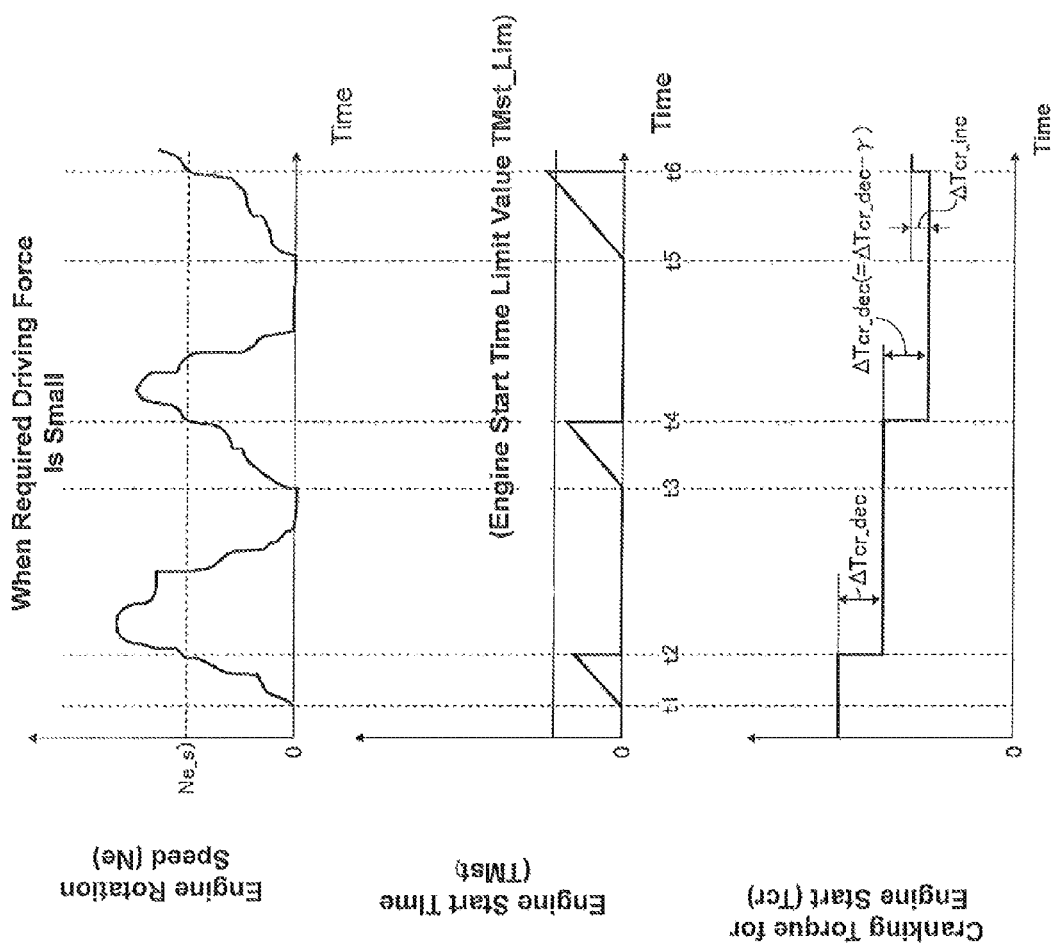
FIG. 3 is an operational time chart illustrating the cranking torque control according to FIG. 2.

However, in the present embodiment, the engine start time TMst is defined to be a time period between engine start commands t1, t3 and t5 in FIG. 3 (start of cranking) and the instants t2, t4 and t6 in FIG. 3, at which engine rotation speed Ne has reached a predetermined rotation speed Ne_s (i.e., 600 rpm).

By counting time thus explained in FIG. 3, measurement of engine start time TMst is made possible without waiting for a completion of engine start operation.

In the subsequent step S12, check is made whether or not the above described engine start time TMst is below a engine start time limit value (upper limit) TMst_Lim. In other words, a determination is made as to whether the engine start time TMst is excessively short with respect to engine start enabling and permissible time so that an overly high responsiveness in engine is required. It should be noted that the engine start enabling region may be defined to be such a region in which the time required for engine start is within a predetermined time and the engine can climb over a compression TDC (Top Dead Center) position of first occurrence.

Figure 4:
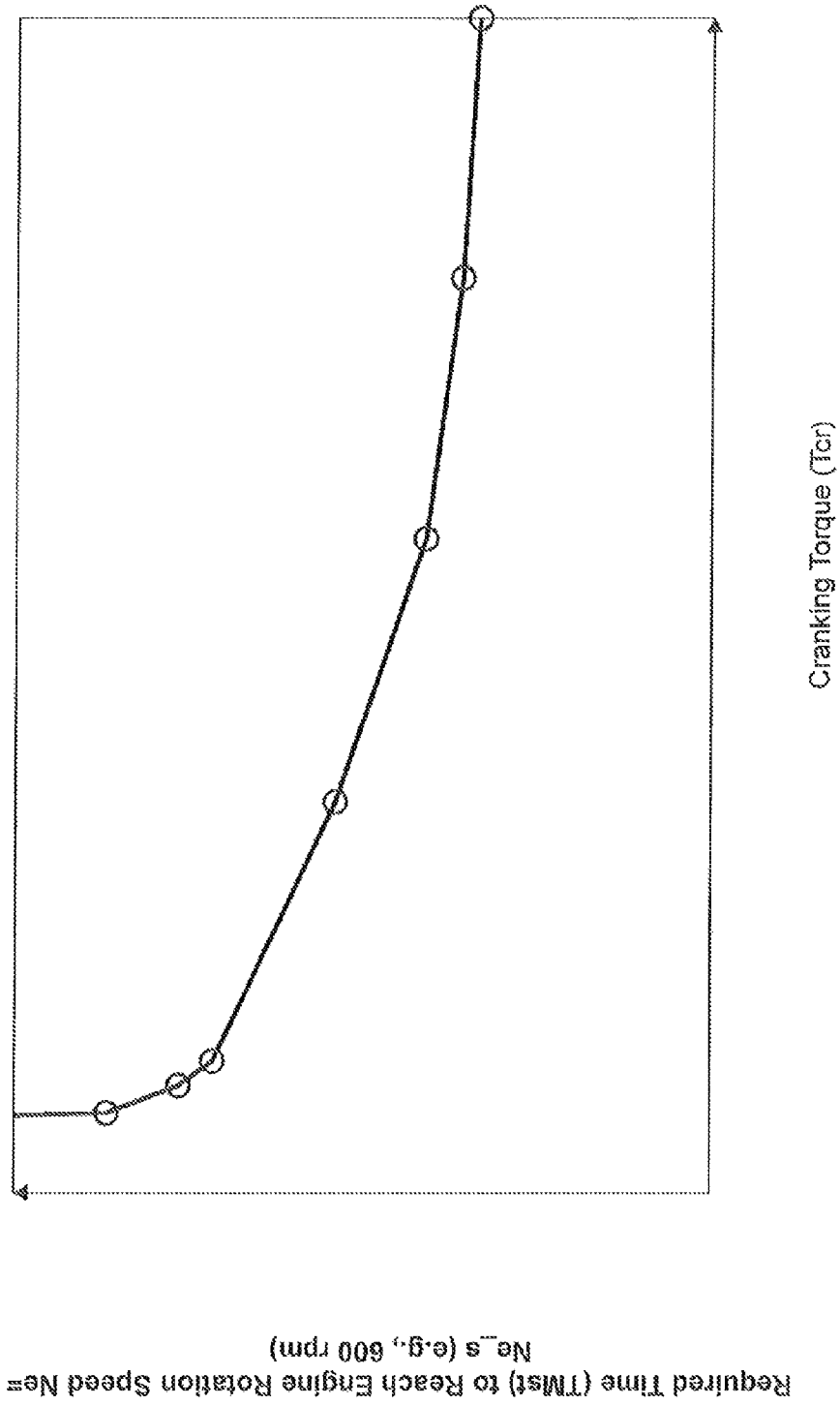
FIG. 4 is a characteristic diagram illustrating engine cranking characteristic showing the relationship of the engine rotation speed with respect to time up to the instance that rotation speed has reached a predetermined speed.

When, in step S12, a determination that TMst<TMst_Lim (starting response of the engine is too high) is made, in view of the relationship of engine start time TMst with cranking torque Tcr being illustrated in FIG. 4, in step S13, as exemplified at instant t2 in FIG. 3, cranking torque Tcr will be adjusted to be reduced by a reduction amount, ΔTcr_dec and the cranking torque Tcr is updated to this adjusted value.

When in step S12, TMst≧TMst_Lim (starting response of engine is too low) is determined, based on the relationship illustrated in FIG. 4 for engine start time TMst and cranking torque Tcr, as in step S16 in FIG. 3, the cranking torque Tcr will be adjusted to be increased by an increase amount ΔTcr_inc, and subsequently cranking torque Tcr will be updated t6 this value after adjustment.

Thus, steps S12 to step S14 are intended to adjust cranking torque Tcr to take less value than the initial value (maximum value) and correspond to the cranking torque adjustment means according to the embodiments.

In step S15 which is selected after execution of step S13 or step S14, it is checked as to whether the increase adjustment in cranking torque has just been performed. Unless the adjustment has just been made in increasing cranking torque Tcr, or, put another way, if the decrease adjustment in cranking torque Tcr has immediately been conducted in step S13, in step S16. The decrease amount in cranking torque ΔTcr_ded will be decreased by a predetermined amount, γ, and updated for use in the subsequent decrease adjustment in cranking torque Tcr in step S13.

Therefore, as appreciated at instants T2, t4 in FIG. 3, when determinations in step S12, i.e., TMst<TMst_Lim (engine response too high) continues and adjustments of cranking torque Tcr in a decreasing direction reiterates in step S13, each time the cranking torque Tcr is adjusted to decrease (step S13), the decrease amount ΔTcr_dec will be decreased by the predetermined amount γ and used in a subsequent decrease adjustment in cranking torque Tcr in step S13 and control stability will be purported during a repetitive, decrease adjustments of cranking torque Tcr.

However, in step S15, when it is determined in step 15 that an increase adjustment in cranking torque Tcr (step S14) has just been made, the adjustment amount ΔTcr_dec will be set to an initial value for use in a decrease adjustment of cranking torque Tcr in step S13 subsequently executed.

In step S18 which is selected after execution of step S17 or step S17, a check is made for occurrence of a phenomenon with an engine friction increase. The increase at engine start in an engine friction is intended to specify a situation in which engine coolant temperature lies at a temperature prior to warming-up, or a failure in engine control system, or other phenomena which deteriorate engine start up property.

Without the phenomena associated with engine friction increase, control returns back step S10 and the above described learning control of the cranking torque Tcr may be repeated.

However, such a phenomenon with increase in engine friction cranking torque is not present, control may return to step S10 and the learning control of cranking torque Tcr may be repeated. However, if the phenomena associated with engine friction increase are experienced at engine start, then the above adjustments in cranking torque Tcr might be inappropriate and inconsistent with reality with a risk of the inability to start the engine, cranking torque Tcr may be reset to initial value (maximum).

Incidentally, in case that the required acceleration is determined to be small in step S10, in step S11 to step S18, the reason for setting cranking torque Tcr to be less than the above described initial value (maximum value) is because of avoiding the occurrence of the problems below due to the excessive magnitude of cranking torque Tcr with respect to required acceleration while in situations in which required accelerations are small and when employing the initial value (maximum value) of the cranking torque Tcr would be used over entire driving regions.

Figure 5:
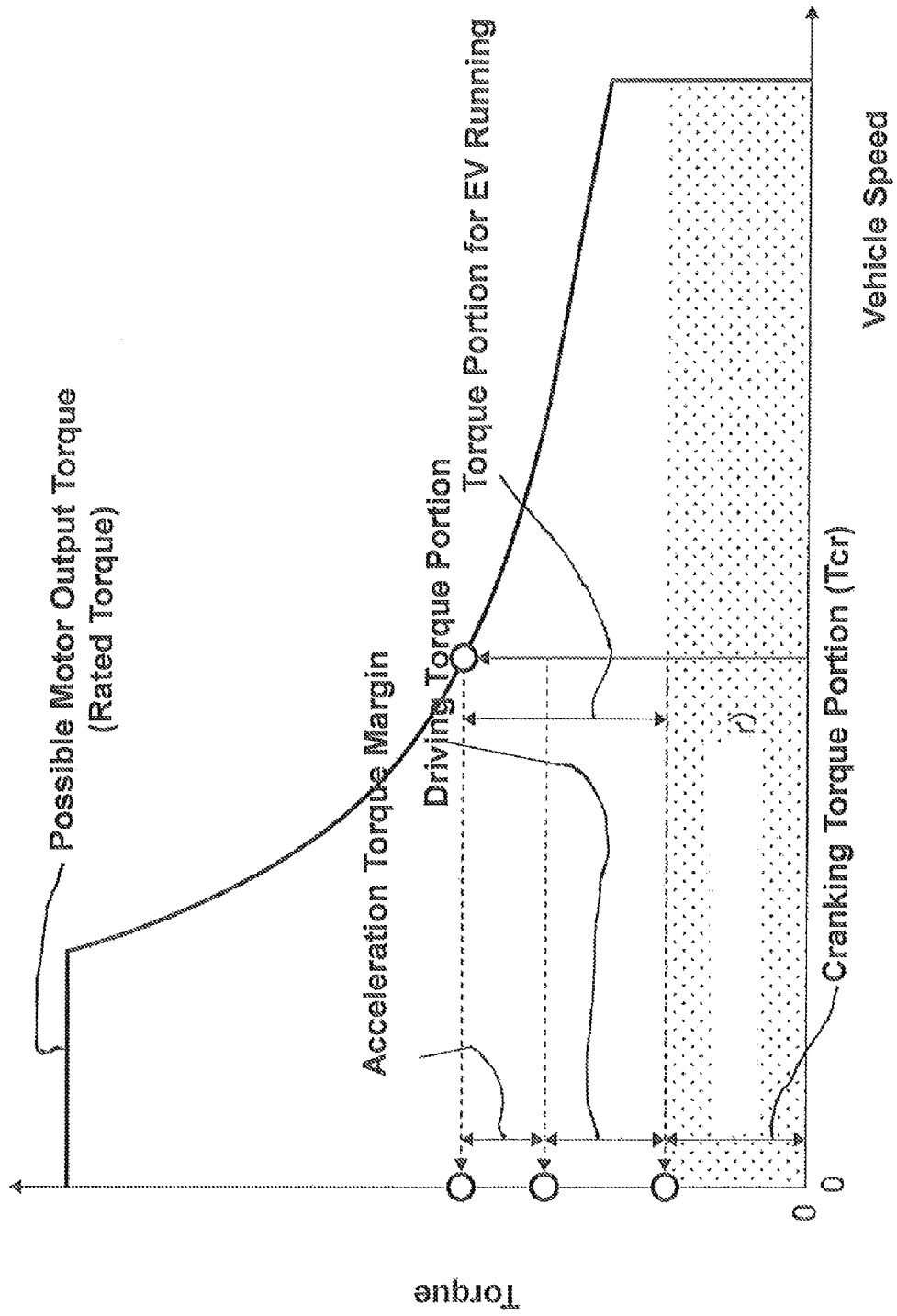
FIG. 5 is a diagram for describing the manner to determine possible motor output torque (rated torque) according to the motor/generation in FIG. 1.

However, to enable motor/generator 6 to start an engine, possible motor output torque (rated torque) of motor/generator 6 that is subject to change as illustrated in FIG. 5 with respect to a vehicle speed VSP (motor/generator rotation speed Nm) has a sufficient amount or magnitude that needs to meet a sum of the torque for EV running including both a driving torque portion corresponding to the vehicle running resistance (such as air resistance and rolling resistance) and an acceleration torque margin corresponding a predetermined acceleration margin, and a cranking torque Tr.

Incidentally, it is generally desirable to keep the rated torque small, and thus the motor/generator as compact as possible in terms of installation space and cost point of view so that the amount of rated torque may be restricted.

On the other hand, however, while the possible output torque (rated torque) is restricted, there is a limit in downsizing since the required acceleration margin is generally prefixed and difficult to be excessively reduced.

In addition, when keeping the cranking torque portion Tcr to take an initial value (maximum value) corresponding to the maximum required driving force as explained above even in situations of small required driving force, the cranking torque portion Tcr becomes excessive, and the driving force which is obtained by deducing a sum of the acceleration torque margin and cranking torque portion Tcr from the motor/generator rated torque will be uselessly small by the excessive amount of the initial value of the cranking torque (maximum value).

When the driving torque portion is reduced this way, because of a lack of torque, the situation might occur earlier, i.e., even at a low vehicle speed, at which a vehicle running under EV mode is not possible and thus the mode has to be switched to the HEV mode earlier, i.e., from a low vehicle speed, in which the vehicle will be driven through cooperation with the engine and motor/generator. This entails a narrow region of EV mode originally intended for improved fuel consumption effect and resulting in a problem of worsening the vehicle fuel efficiency.

Figure 6:
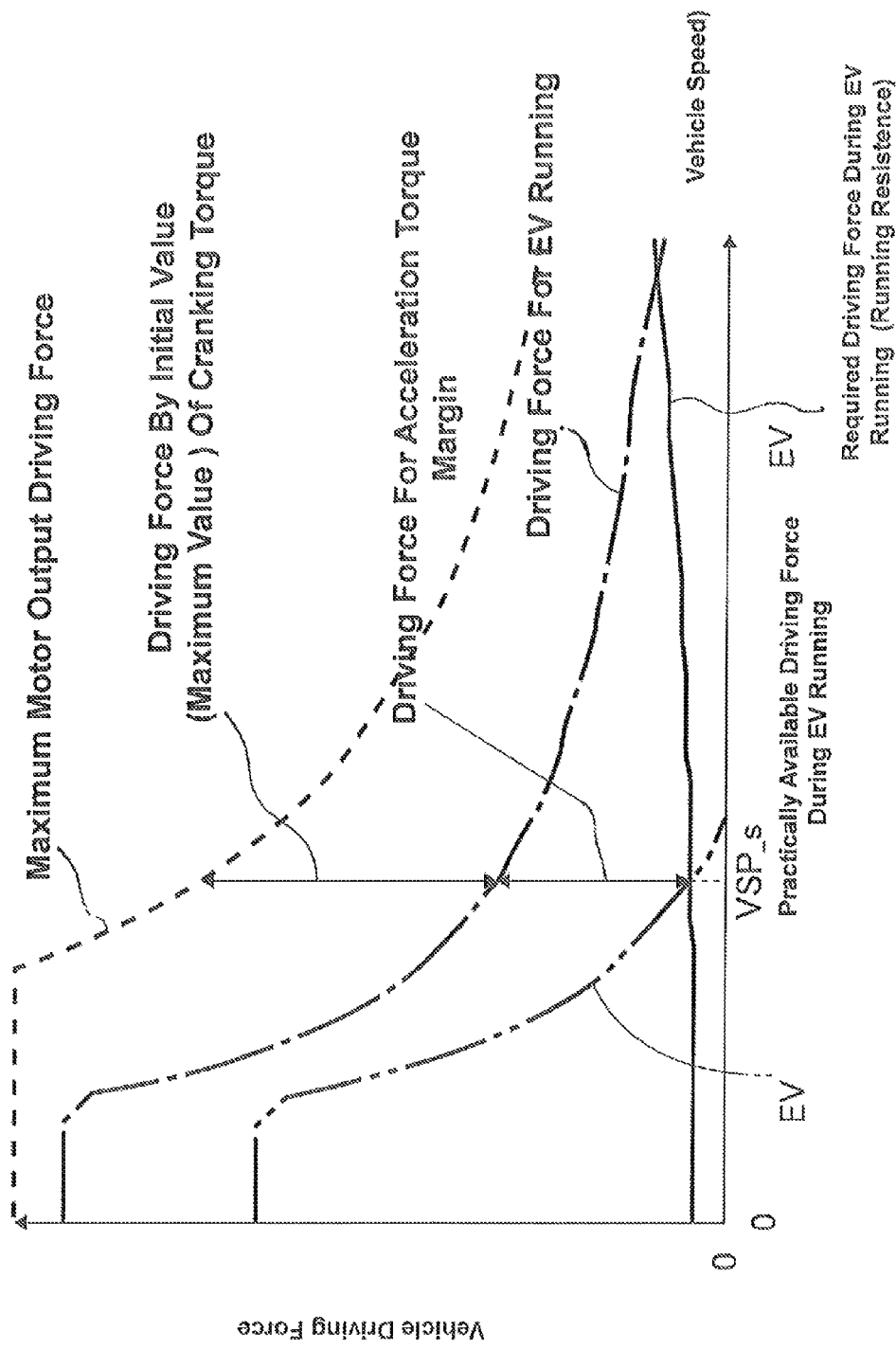
FIG. 6 is a diagram illustrating an available driving force or torque for EV running of the motor/generator out of the possible motor output torque (rated torque) illustrated in FIG. 5 with the required driving force on the premise that the cranking torque is at initial value (maximum value).

For additional explanations on the basis of FIG. 6, reference is made to FIG. 6 where a possible maximum driving force output of motor is shown by a broken line, that is the driving force equivalent to the possible motor output torque (rated torque) in FIG. 5. Also, the driving force for EV running (driving force equivalent to the EV running torque portion in FIG. 5) which is obtainable by subtracting the driving force corresponding to the initial value (maximum value) of cranking torque portion Tcr in FIG. 5 from the possible motor output driving force is indicated by a chain dashed line. A practically available driving force for EV running (a driving force equivalent to the torque portion for EV running in FIG. 5) which is obtainable by subtracting a driving force for acceleration torque margin corresponding to the acceleration torque margin, which is a driving force equivalent to the acceleration torque margin portion in FIG. 5, from the EV running driving force is shown in a double-dashed line. Finally, an EV running required driving force (the aforementioned running resistance) is indicated by a solid line.

If the initial value (maximum value) of cranking torque Tcr is used over the entire operating regions, in situations requiring a small acceleration, the driving force due to the initial value (maximum value) of the cranking torque portion Tcr becomes larger than necessary, and hence the practically available driving force for EV running will be restricted smaller about the excessive amount, as shown in the Figure.

Therefore, during the EV running, immediately upon reaching a relatively lower vehicle speed VSP_s, the practically available driving force for EV running (double-dashed line) to be used for EV running may fall below the EV running required driving force (solid line) and thus the EV running by way of motor/generator 6 only will not be possible due to a lack in driving force of motor/generator 6. Therefore, when the vehicle speed VSP meets the expression, VSP≧VSP_s, a switch to a HEV running mode have to be compelled under collaboration of engine 1. Thus, the EV mode region in which a fuel consumption is purported to be improved will be small and restricted to the region indicated by VSP<VSP_s shown in FIG. 6. with a result of deteriorated fuel efficiency.

Incidentally, in the present embodiment, when the required acceleration is determined to be large (step S10), although cranking torque Tcr will be set to the above mentioned initial value (maximum value) in step S19, when the required acceleration is small (step S10), cranking torque Tcr is adjusted to a smaller value such that an engine start time TMst may be set to an engine start enabling and permissible limit value TMst_Lim and cranking torque Tcr will not exceed the required driving force (see step S11 to step S18). Therefore, when the practically available driving force may be adjusted to increase about the above explained decrease amount of cranking torque Tcr for situations requiring a small acceleration.

Therefore, when the required acceleration is small, the vehicle speed VSP_s at which the practically available driving force during EV running falls below the EV running required driving force and, due to a lack in driving torque of motor/generator 6, the EV running by way of motor/generator 6 only will not be feasible, may be shifted from the vehicle speed value shown in FIG. 6 in a high speed direction with a result that a fuel economy may be improved by an expanded region of EV mode for fuel efficiency improvement purpose and resolution of the above referenced problem of fuel economy deterioration.

Figure 7:
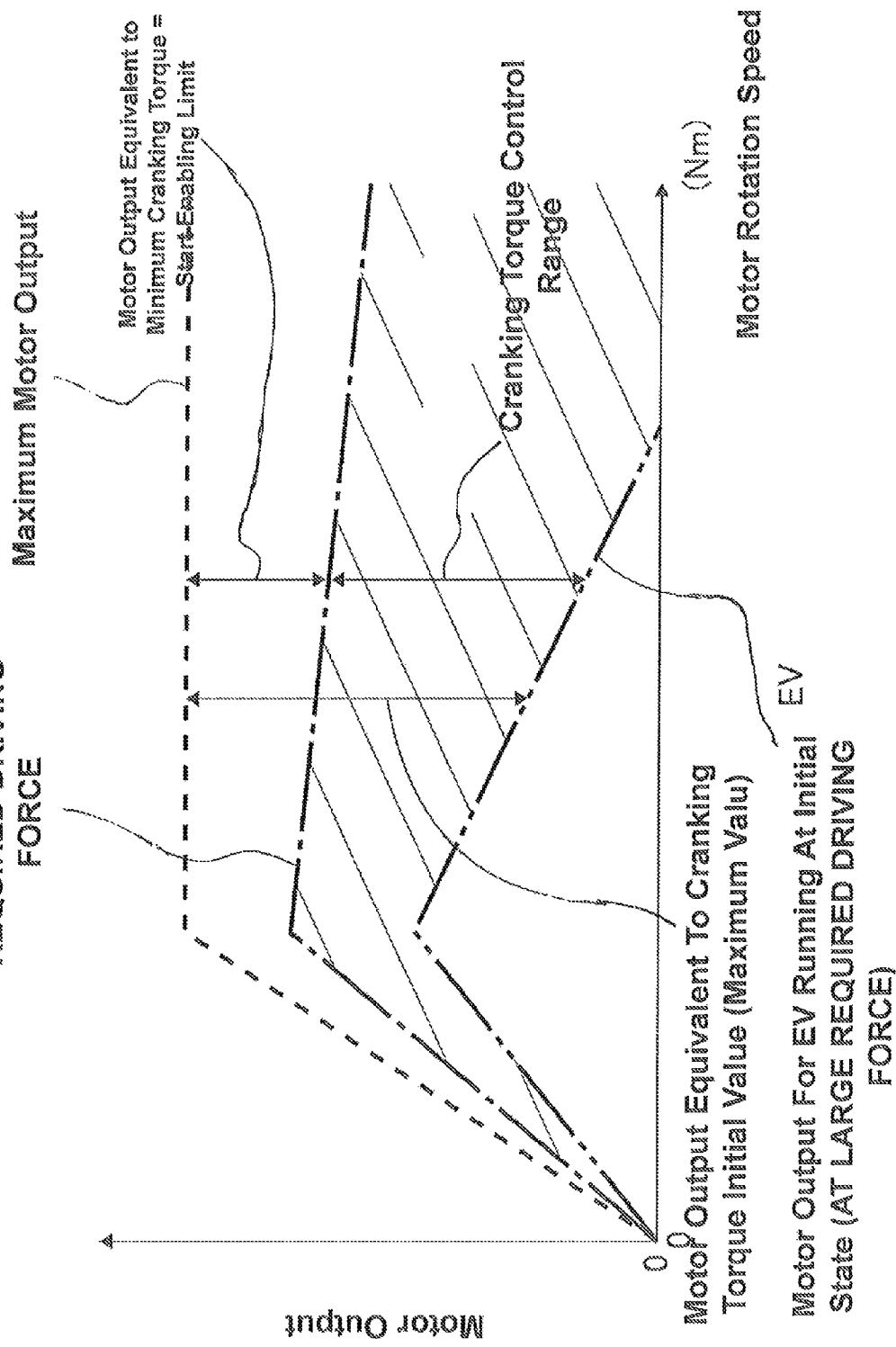
FIG. 7 is an explanatory diagram showing a cranking torque control region or range in terms of motor output when the cranking torque control according to control program in FIG. 2.

By referring to FIG. 7, the decrease adjustment range (control range) of cranking torque Tcr from the initial value (maximum value) is now described in connection with a motor output basis of motor/generator 6. In FIG. 7, the maximum motor output from motor/generator 6 is shown in a broken line. Also, when the cranking torque Tcr is at initial value (maximum value), the initial motor output of motor/generator available for EV running may be obtainable by deducing a motor output equivalent to the initial cranking torque (maximum value) from the maximum motor output (broken line) and is represented in a double-dashed line Therefore, the control range of cranking torque Tcr shall be depicted on a motor output basis of motor/generator 6 as is shown between the double-dashed line and a single-dashed line. Here, when the required acceleration is small, the motor output available for EV running out of motor/generator is increased from a level specified by the double-dashed line in FIG. 7 to a level specified by the single-dashed line so that, by just as much as the increased amount in motor output for EV running, the upper limit vehicle speed for EV running will be raised, and the mode switching to HEV mode will be postponed.

Figure 8:
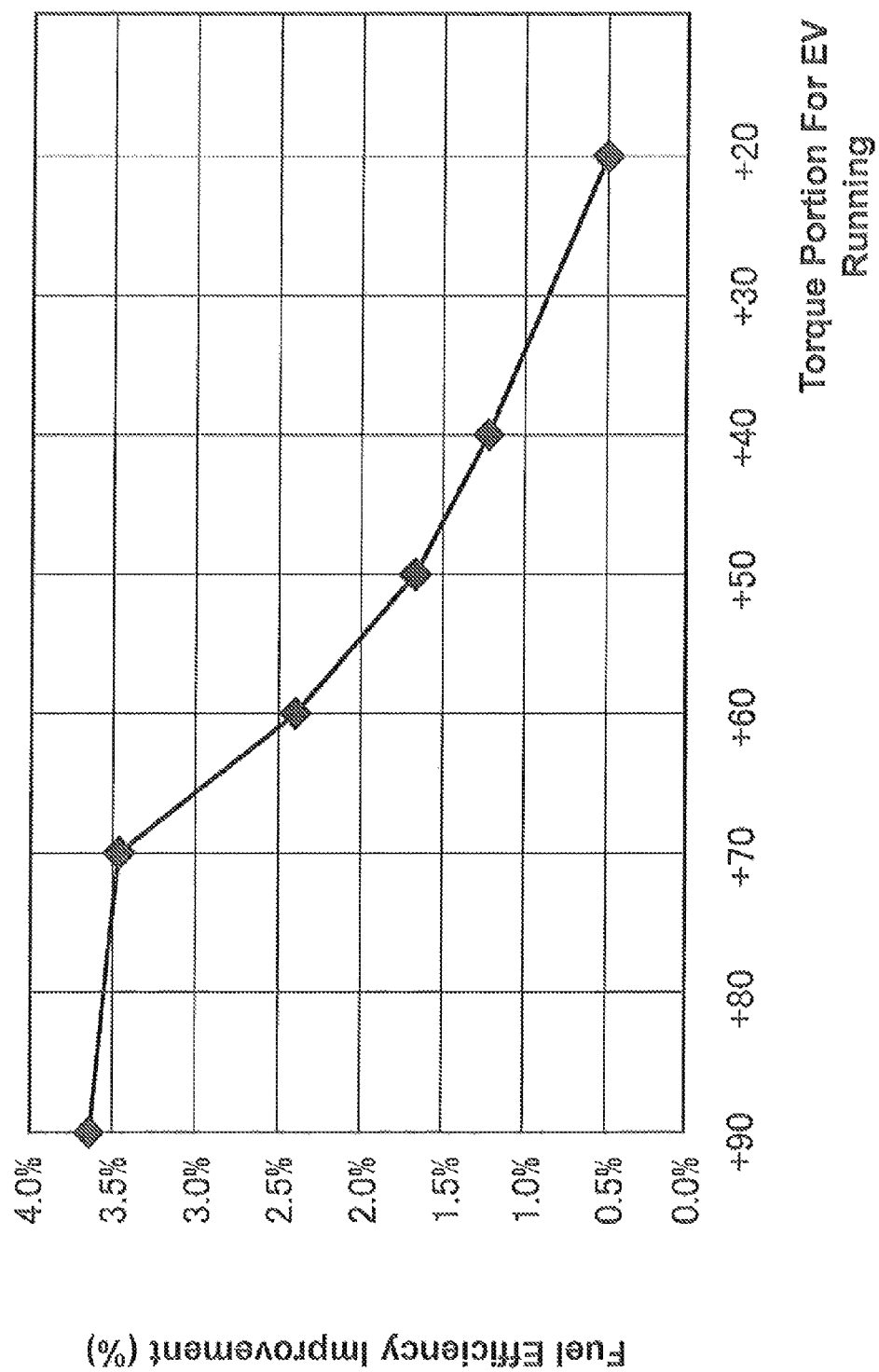
FIG. 8 is a characteristic diagram showing change in fuel improvement rate achieved by the cranking torque control at engine start as illustrated in FIG. 1.

Therefore, the EV mode range for improvement of fuel efficiency may be expanded to a higher vehicle speed region and corresponding to the expanded region of EV mode, vehicle fuel economy will be improved as shown in FIG. 8.

Although cranking torque Tcr is basically controlled as above described, the easiness with which the engine may be restarted (engine start up property) may vary depending on its stop position (crank angle ast). Thus, in the present embodiment, cranking torque Tcr is also made subject to change based on the engine stop position (crank angle ast).

Figure 9:
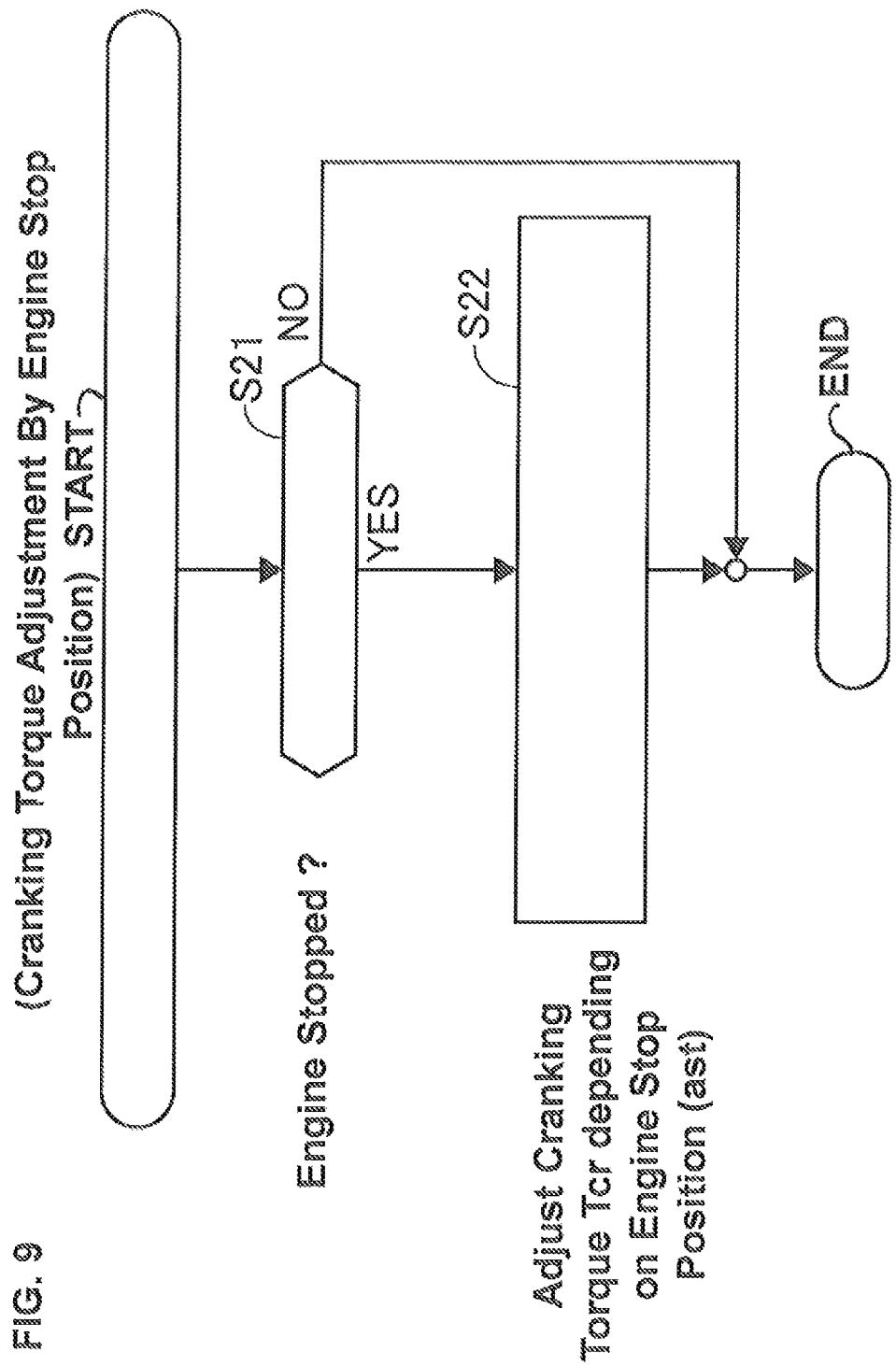
FIG. 9 is a flowchart explaining a cranking torque control program depending on an engine stop position that is performed by the hybrid controller of power train control system in FIG. 1.
Figure 10:
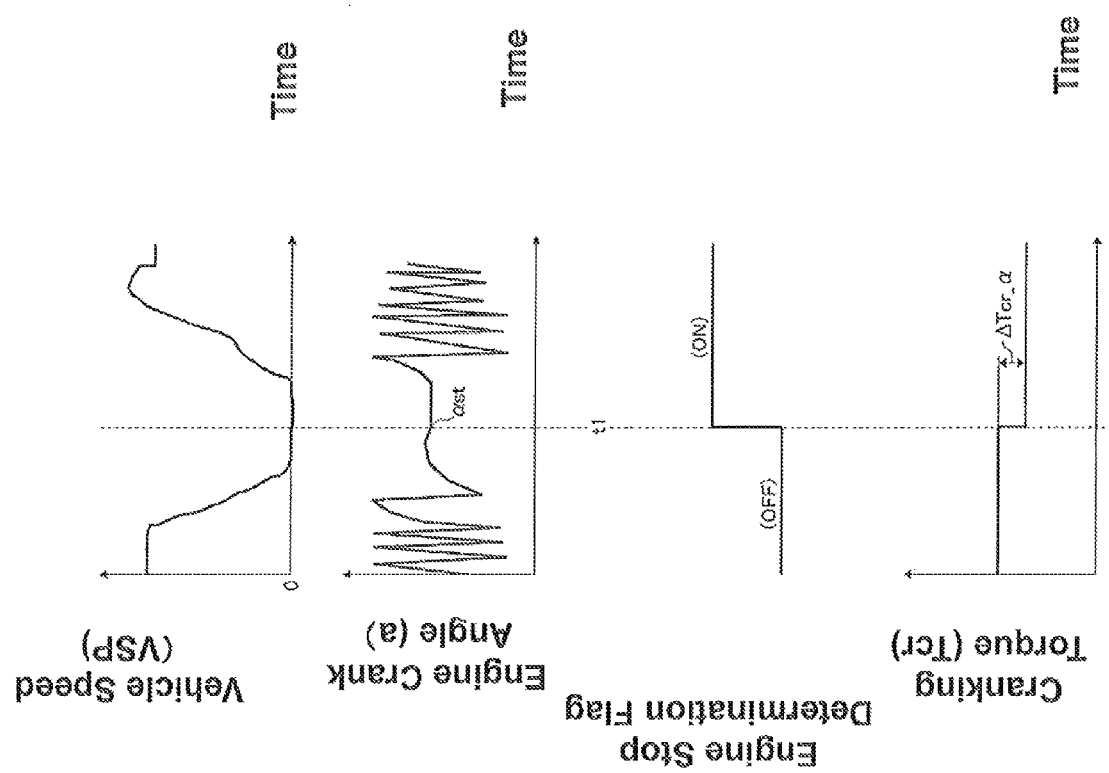
FIG. 10 is an operational time chart illustrating the cranking torque control depending on the engine stop position illustrated in FIG. 9.

To this aim, the hybrid controller 11 in FIG. 1 performs a control program in FIG. 9 and, as shown in FIG. 10, makes an adjustment in cranking torque Tcr in accordance with an engine stop position (crank angle ast).

In step S21, a check is made whether or not engine has stopped, if engine has not yet stopped, control exits, while engine 1 has come to stop, control proceeds to step S22 in which adjustment in cranking torque Tcr is made in accordance with an engine stop position (crank angle ast).

More specifically, in step S22, when the engine 1 is confirmed to be stopped (at the instant t1 in FIG. 10), engine crank angle reading a is set to be that of a engine stop position (i.e., crank angle ast). When the engine stop position (crank angle ast) represents that of an easier engine restart property, then as show in in FIG. 10, cranking torque Tcr may be decreased by ΔTcr_a corresponding to a high restart property. On the other hand, when the engine stop position (crank angle ast) is that of a low engine restart property, then cranking torque Tcr will be increased to compensate for the low start up property.

Therefore, step S22 corresponds to the engine stop position detecting means and cranking torque adjustment means according to the present invention.

According to the engine start control (cranking torque adjustment) in the above described embodiments, although for a large required acceleration (at step S10) cranking torque Tcr is set to be an initial value (maximum value) at step S14, when the required acceleration is small (step S10), cranking torque Tcr will be adjusted to be decreased and take a value smaller than the initial value (maximum value) in such a way that engine start time TMst is an engine start enabling, permissible limit value TMst_Lim with a result that cranking torque Tcr will not be excessively large as compared to the required driving force (at step S11 to step S18), at a small required acceleration, the practically available driving force for EV running in FIG. 6 may be expanded about the decrease amount in cranking torque Tcr.

In addition, since the limit value TMst_Lim is set to be a engine start enabling and permissible or acceptable critical value associated with an engine start time, the lower limit value of cranking torque Tcr corresponds the engine start enabling and permissible lower limit of cranking angle so that the above effects may be achieved without causing an engine to be disabled to start or inconvenience of prolonged starting time.

Moreover, in the present embodiment, the time between the initiation or start of cranking (t1, t3, t5 in FIG. 1) and the instant (t2, t4, and t6, in FIG. 3) at which engine rotation speed Ne reached a predetermined rotation speed Ne_s is measured as an engine start time TMst and employed, measurement of engine start time TMst is available without waiting for completion of engine start operation so that responsiveness of control will be improved.

Still further, as described above in reference to FIGS. 9 and 10, when the engine stop position (crank angle ast) is at that which represents a high engine start property, cranking torque Tcr will be decreased in view of the high start property, while, when the engine stop position (crank angle position ast) is at a low engine restart property, cranking torque will be accordingly increased to compensate for the lower engine start property, an appropriate adjustment in cranking torque Tcr is made in accordance with the engine stop position (crank angle ast) closely related to the easiness of engine restart so that cranking torque may be adjusted to an appropriate value, nether too large nor too small, to further ensure the above referenced effects.

In the illustrated embodiment, the limit value for engine start time TMst_Lim in step S12 in FIG. 2 is defined as such a limit value that enables engine start and yet acceptable for engine start time. However, this limit value TMs_Lim may be substituted for a limit value for enabling engine start with a required responsiveness depending on the respective required accelerations.

In this case, in step S12, a check is made whether or not the engine start time TMst is excessively short for the required engine start responsiveness corresponding to the respective required acceleration, and the engine start responsiveness is too high for the requested acceleration. When the engine start responsiveness is too high for the required acceleration, cranking torque Tcr will be adjusted to be decreased in step S13, and when the engine start responsiveness is too low for the required acceleration cranking torque Tcr is adjusted to be increased in step S14.

Therefore, as the required acceleration decreases, motor output for EV running of motor/generator 6 available for EV running will be continuously increased from the level specified by double-dashed line in FIG. 7 to that of single-dashed line, and EV running (EV mode) region will be continuously expanded with the decrease of the required acceleration, which allows more precise control according to the required acceleration.

What is claimed is:

1. An engine start control system for a hybrid electric vehicle having a power train comprised of an engine, a first clutch, a motor/generator, a second clutch and driving wheels as the torque transmission path, the hybrid electric vehicle being operable in two driving modes by selectively controlling an engagement or release of the first and second clutches so that the vehicle may be either electrically driven by the motor/generator only, or may be driven by both the engine and the motor/generator under a hybrid mode, the system comprising:

means to start the engine by a cranking torque from the motor/generator in response to engagement of the first clutch; and means for adjusting the cranking torque configured to decrease the cranking torque when a required vehicle acceleration is small.

2. The engine start control system for the hybrid electric vehicle as claimed in claim 1, wherein the means to start the engine has an adjustable lower limit of engine torque required for engine start, and the means for adjusting the cranking torque is further configured to decrease the adjustable lower limit to a lower limit of engine torque that enables the engine start.

3. The engine start control system for the hybrid electric vehicle as claimed in claim 2, wherein the means for adjusting the cranking torque is configured to determine the lower limit of engine torque that enables the engine start based on a respective required acceleration.

4. The engine start control system for the hybrid electric vehicle as claimed in claim 1 further comprising:
    means for measuring engine start time configured to measure an engine start time required for an engine start, wherein the means for adjusting the cranking torque is further configured to adjust the cranking torque so that the measured engine start time matches a predetermined time.

5. The engine start control system for the hybrid electric vehicle as claimed in claim 4, wherein the predetermined time is a limit value for an engine start time that is capable of starting the engine.

6. The engine start control system for the hybrid electric vehicle as claimed in claim 4, wherein the predetermined time is a respective limit value which is capable of starting the engine in a required responsiveness according to a required respective acceleration.

7. The engine start control system for the hybrid electric vehicle as claimed in claim 4, wherein the means for measuring engine start time is further configured to measure a time from a cranking starting instant through an instant at which an engine rotation speed reaches a predetermined rotation speed.

8. The engine start control system for the hybrid electric vehicle as claimed in claim 1 further comprising:
    means for detecting an engine stop position, wherein the means for adjusting the cranking torque is further configured to adjust the cranking torque in accordance with a detected engine stop position.

9. A method of controlling engine start for a hybrid electric vehicle having a power train comprised of an engine, a first clutch, a motor/generator, a second clutch and driving wheels as the torque transmission path, the hybrid electric vehicle being operable in two driving modes by selectively controlling an engagement or release of the first and second clutches so that the vehicle may be either electrically driven by the motor/generator only, or may be driven by both the engine and the motor/generator under a hybrid mode, the method comprising:
    determining an accelerator command;
    if the accelerator command is less than a predetermined acceleration, decreasing a cranking torque to a smaller value.

10. The method of claim 9, wherein a means to start the engine has an adjustable lower limit of engine torque required for engine start, and decreasing the cranking torque comprises decreasing the adjustable lower limit to a lower limit of engine torque that enables the engine start.

11. The method of claim 10 further comprising:
    determining the lower limit of engine torque that enables the engine start based on a respective required acceleration.

12. The method of claim 9 further comprising:
    measuring an engine start time required for an engine start; and
    adjusting the cranking torque so that the measured engine start time matches a predetermined time.

13. The method of claim 12, wherein the predetermined time is a limit value for an engine start that is capable of starting the engine.

14. The method of claim 12, wherein the predetermined time is a respective limit value which is capable of starting the engine in a required responsiveness according to a required respective acceleration.

15. The method of claim 12, wherein measuring the engine start time comprises measuring a time from a cranking starting instant through an instant at which an engine rotation speed reaches a predetermined rotation speed.

16. The method of claim 9 further comprising:
    detecting an engine stop position; and
    adjusting the cranking torque in accordance with a detected engine stop position.

* * * * *